United States Patent
Petrocelli

(10) Patent No.: US 9,632,889 B2
(45) Date of Patent: Apr. 25, 2017

(54) METHOD FOR THE OPTIMIZATION OF PERFORMANCE, CAPACITY AND REDUNDANCY IN DIGITAL DATA STORAGE SYSTEMS

(71) Applicant: ORACLE INTERNATIONAL CORPORATION, Redwood Shores, CA (US)

(72) Inventor: Robert Petrocelli, Westerly, RI (US)

(73) Assignee: Oracle International Corporation, Redwood Shores, CA (US)

( * ) Notice: Subject to any disclaimer, the term of this patent is extended or adjusted under 35 U.S.C. 154(b) by 98 days.

(21) Appl. No.: 13/674,277

(22) Filed: Nov. 12, 2012

(65) Prior Publication Data

US 2014/0136886 A1    May 15, 2014

(51) Int. Cl.
   *G06F 11/00* (2006.01)
   *G06F 11/20* (2006.01)
   *G06F 11/10* (2006.01)

(52) U.S. Cl.
   CPC ...... *G06F 11/2094* (2013.01); *G06F 11/1076* (2013.01); *G06F 2201/85* (2013.01)

(58) Field of Classification Search
   CPC ............... G06F 3/0689; G06F 11/1076; G06F 2211/1028; G06F 2211/1057; G06F 3/061; G06F 2211/1059
   USPC ........................................................ 714/6.22
   See application file for complete search history.

(56) References Cited

U.S. PATENT DOCUMENTS

| | | | |
|---|---|---|---|
| 7,783,917 B2 * | 8/2010 | Sheppard et al. | 714/6.12 |
| 7,937,551 B2 * | 5/2011 | Schott | 711/173 |
| 2004/0153606 A1 * | 8/2004 | Schott | 711/114 |
| 2005/0210322 A1 * | 9/2005 | Corrado | 714/13 |
| 2007/0180190 A1 * | 8/2007 | Li | G06F 3/0608 711/114 |
| 2009/0235042 A1 * | 9/2009 | Petrocelli | G06F 1/3203 711/170 |
| 2009/0307424 A1 * | 12/2009 | Galloway et al. | 711/114 |
| 2011/0145528 A1 * | 6/2011 | Watanabe | G06F 3/0605 711/162 |
| 2012/0317355 A1 * | 12/2012 | Ishizaki | G06F 3/0607 711/114 |

* cited by examiner

*Primary Examiner* — Elmira Mehrmanesh
(74) *Attorney, Agent, or Firm* — Marsh Fischmann & Breyfogle LLP; Daniel J. Sherwinter

(57) ABSTRACT

A method and system of optimizing the performance, capacity and data redundancy in a storage system by defining the LBA range on each storage element managing that corresponding range (slice) on each device using a data protection method optimized for the performance and level of data protection required. The creation of such a storage array along with the replacement of failed elements and the expansion of the capacity through the addition of additional elements is managed is an automatic and transparent manner.

21 Claims, 1 Drawing Sheet

METHOD FOR THE OPTIMIZATION OF PERFORMANCE, CAPACITY AND REDUNDANCY IN DIGITAL DATA STORAGE SYSTEMS

BACKGROUND OF THE INVENTION

1. Field of the Invention

The present method generally relates to the protection from inadvertent loss of data on digital storage system. Specifically the method describes software running on the CPU of a computer system.

2. Background of the Related Art

The operation of computers is very well known in the art. File systems exist on a computer or across multiple computers, where each computer typically includes data storage, such as a hard disk or disk(s), random access memory (RAM) and an operating system for executing software code. Software code is typically executed to carry out the purpose of the computer. As part of the execution of the computer code, storage space on the hard disk or disks and RAM are commonly used. Also, data can be stored, either permanently or temporarily on the hard disk or disks and in RAM. The structure and operation of computers are so well known in the art that they need not be discussed in further detail herein.

In the field of computers and computing, file systems are also very well known in the art to enable the storage of data as part of the use of the computer. A computer file system is a method for storing and organizing computer files and the data they contain to make it easy to find and access the data. File systems may use data storage devices, such as hard disks or solid state devices, for storing data. Data storage devices involve maintaining the physical location of the files, and these devices might include more sophisticated features such as providing access to data by the computer operating system or on a file server by acting as clients for a network protocol (e.g., NFS, SMB, or FTP clients). Also, they may be virtual devices and exist only as an access method for virtual data.

As any physical device is subject to failure methods have been developed which seek to reduce the probability of data loss should one or more physical storage devices (e.g. hard drives or solid state disks) fail.

A common method of data protection is referred to as RAID (Redundant Array of Independent Disks). RAID methods vary in their details but most have been designed to prevent data loss by creating copies of a data element on more than one physical device.

RAID systems create the redundant copies in a manner which is transparent to the software application utilizing this data. For example a database application will access a RAID protected collection of storage elements (hard disks for solid state drives) as if they were a single storage device. The common feature of all RAID systems is that the RAID elements, or individual disks, are never separately addressable by an application using the data stored on the RAID system. This access is virtualized.

RAID methods have been well studied and classified. The type of data protection employed is described using a set of well accepted terms. For example, the most basic type of RAID, RAID-1 is a method where two storage devices each of the same physical capacity are virtualized to appear as a single storage device. In this case data is protected using a method called data mirroring. Data mirroring is the process by which each data block on the RAID-1 device is duplicated on both of the disks used to create the assemblage. The result is that if one device fails the data can still be accessed on the remaining device.

A second very common method of RAID protection involves the use of three or more drives in a RAID array and is commonly called a parity RAID method. Specifically a mathematical transform is used to compute codes which can be used to reconstruct a data block should one or more of the storage devices fail. This method is commonly employed because it increases the amount of storage capacity available to applications using the RAID array.

An example of parity RAID referred to as RAID5 or single parity RAID utilizes one extra storage device in each RAID array to protect the data. In a 3 disk RAID5 (the smallest possible configuration) the usable capacity of the array with equally-sized disks (of size N) would be 2*N. In general a single parity array with M elements of size N will have capacity=(M−1)*N.

This RAID method has commonly been extended to utilize more that one parity drives. These methods are commonly referred to as double or even triple parity RAID methods. The capacity of a parity based method can be computed as follows: capacity=(M−P)*N where P is the parity cardinality (e.g. 1, 2, 3 etc.) M is the number of total drives, where M=(at least) P+2 and N is the size of each RAID element (e.g. disk drive or solid state device)

While RAID reduces the probability of data-loss, it incurs a significant data access performance penalty. Because each element in a RAID stores only part of the total data block each element must be accessed in a synchronized manner in order to read or write data from the RAID array.

Because all elements must be addressed together, the number of read or write operations that can be performed per second (common called IOs per second or IOPs) will be no greater than that of a single element in the array. Therefore the larger the RAID array the greater the IOP penalty becomes.

The common trade-off that must be made is therefore one of capacity versus performance. An array of non-RAID protected storage elements would provide highest IOPS at the expense of no data protection. A mirror would provide the best performance but would reduce capacity by ½. A 5 element single parity RAID would provide ⅘ of the potential capacity but only ⅕ of the potential performance.

Accordingly, there is a need in the industry for a method of improving the performance of data access in data storage systems, yet preserve the redundancy essential to protecting data stored in these data storage systems.

SUMMARY OF THE INVENTION

The present invention preserves the advantages of prior art methods, devices and systems for RAID protection. In addition, it provides new advantages not found in currently available methods, devices and systems therefor and overcomes many disadvantages of such currently available methods, devices and systems.

The present invention provides a new type of RAID in which a portion of each element (disk drive or solid state device) can participate in a different type of data protection method. Specifically each element may be divided into a set of logical slices each representing a range of logical block addresses on the device. A new type of RAID array is created where all of the devices are combined into an array, but each slice is protected by a different RAID method. The simplest example would be an array of two devices. If each device is treated as two slices of equal size then a RAID array can be created in which the first array on each device is separately accessible (not protected) and the second slice of each device is mirrored (RAID1) and therefor protected.

The advantage of this method is that the application using this array may now place data on one of two logical devices. The first slice provides maximum IOPs the second slice maximum protection. For applications which can classify the protection and performance needs of the data blocks being access, this method allows for optimal performance and protection without the need for compromise.

This method allows for any number of slices and any combination of RAID protection levels to be employed in a single array.

This method greatly reduces the total number of disks needed to deploy more than one RAID type as all prior RAID methods are monolithic employing the entire capacity of each disk in that RAID array. And while prior methods allow for the combination of RAID methods in a large storage device each RAID subset must still employ the entire physical disk.

BRIEF DESCRIPTION OF THE DRAWINGS

The novel features which are characteristic of the present invention are set forth in the appended claims. However, the invention's preferred embodiments, together with further objects and attendant advantages, will be best understood by reference to the following detailed description taken in connection with the accompanying drawings in which:

DETAILED DESCRIPTION OF THE PREFERRED EMBODIMENT

Figure 1:
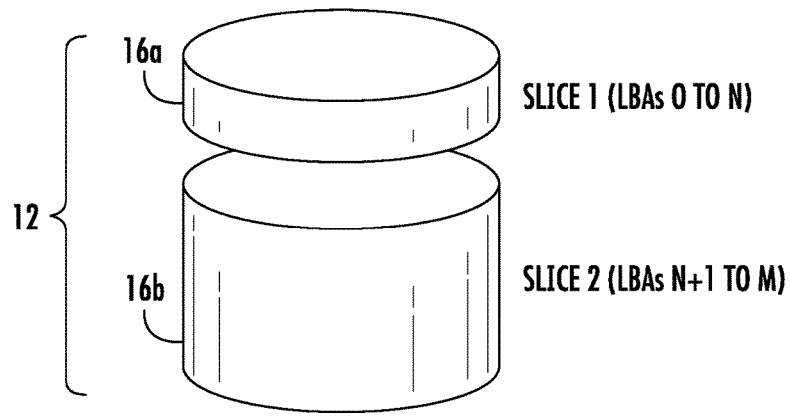
FIG. 1 is a close-up diagrammatic representation of a storage device.
Figure 2:
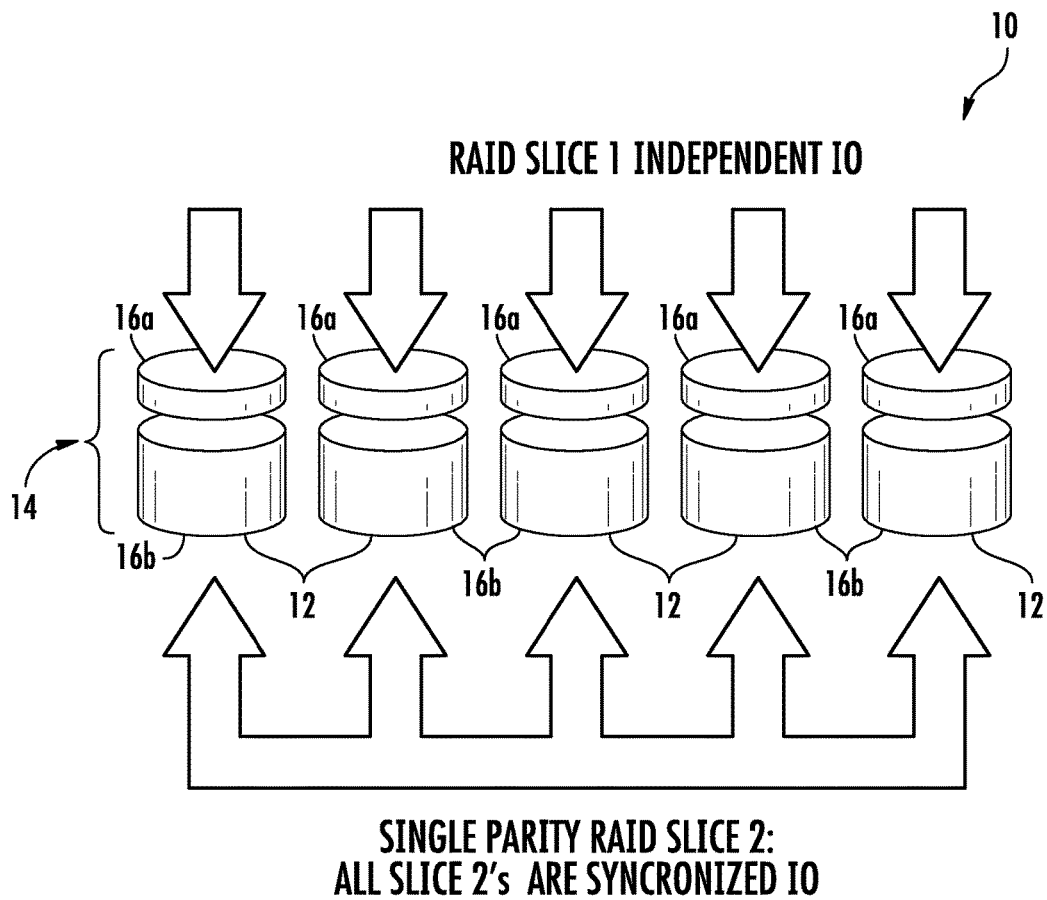
FIG. 2 is a diagrammatic representation of the method of the present invention.

As seen in the attached drawing FIG. 1, details of the preferred embodiment of the method of the present invention is shown generally at 10. In accordance with the method of the present invention, performance, capacity and data redundancy is optimized by dividing each low latency storage device 12, in an array 14 of storage devices 12, into two or more logical slices 16a, 16b.

Each logical slice 16a, 16b is protected using a different RAID protection method (or no protection if single slice access is desired) across the array 14 of storage devices 12. That is, for example and not by way of limitation, all slice 1's 16a of each storage device 12 may be, for instance, protected by RAID1 while all slice 2's 16b protected by RAID5. The size and RAID type used for each slice 16a 16b is dictated by the needs of the application using the storage system 10.

The RAID method selected can be optimized for high IOPS, data protection (or integrity), or capacity. Each RAID method applied to each slice 16a, 16b is different in order to provide the level of data protection desired with reference to the desired speed of data access.

Each storage device 12 of the array 14 is treated as a whole for the purposes or replacement as a result of failure or the expansion of capacity of the array 14 of storage devices 12. If a storage device 12 were to fail, the entire storage device 12 is replaced. The RAID methodology being implemented across the slices 16a, 16b would reconstruct the data on its slices 16a, 16b per the RAID level implemented on each slice 16a, 16b. Accordingly, slice 1 16a that was implementing RAID1 would copy the data from another mirrored slice 1 from another storage device 12 in the array 14, and slice 2 16b that was implementing RAID5, would reconstruct its segment of the data from the remaining RAID5storage devices 12. As can be appreciated by one skilled in the art, the reconstruction of data on the various slices of the replacement storage device 12 (and time to reconstitute) is dependent on the RAID level being implemented on that particular slice 16a, 16b. Furthermore, a slice 16a, 16b implementing no RAID would result in loss of data during a failure of the storage device 12.

There is no limit to the number of slices 16a, 16b in each storage device 12. That is, if three or more levels of data protection and/or IOPs are desired, the slices 16a, 16b are constructed and the different RAID levels may implemented on the storage system 10. Data is prioritized for placement on the storage devices 12 by its IOPS. That is, applications will place the data requiring the highest number of IOPS on the slices which employ high IOPs RAID methods. Data that has low IOPS is placed on the slices employing low IOPs RAID methods.

An application will place the data blocks requiring the largest capacity on slices 16a, 16b which employ RAID methods optimized for capacity.

The method and system was, in part, designed to be deployed using low latency solid state devices, such as RAM or NAND, as storage device, which do not have moving parts or physical latency when randomly accessing data.

Therefore, the storage system and method described herein provides a solution to the problem of providing a storage system that provide a high degree of data integrity, but allows for increased performance by providing data on logical slices of a storage system implementing different RAID levels.

It would be appreciated by those skilled in the art that various changes and modifications can be made to the illustrated embodiments without departing from the spirit of the present invention. All such modifications and changes are intended to be within the scope of the present invention except as limited by the scope of the appended claims.

What is claimed is:

1. A method for optimizing the performance, capacity and redundancy of a plurality of physical storage devices having data stored thereon, the method comprising:
dividing each of the physical storage devices into at least two logical slices, a first slice of each physical storage device occupying logical block address 0 to n, and a second slice of each physical storage device occupying logical block addresses n+1 to m;
assigning a first combination having all the first slices of the physical storage devices to a first RAID method that uses independent IO;
assigning a second combination having all the second slices of the physical storage devices to a second RAID method that uses synchronized IO; and
automatically rebuilding the data on each slice, according to its RAID method, of a particular physical storage device upon failure and replacement of the particular physical storage device,
whereby the second RAID method is different from the first RAID method, and each RAID method is assigned to its respective combination based on desired input/outputs per second (IOPS) and data protection for data to be stored in the respective range of logical block addresses of the combination.

2. The method of claim 1, wherein the first combination utilizes RAID1.

3. The method of claim 1, wherein the first combination utilizes RAID0.

4. The method of claim 1, wherein the second combination utilizes RAID5.

5. The method of claim 1, wherein the first combination utilizes single-parity RAID method.

6. The method of claim 1, wherein the second combination utilizes a single-parity RAID method.

7. The method of claim 1, wherein each physical storage device is a low latency solid state device.

8. A data storage system, comprising:
a plurality of physical storage devices in an array;
each of the physical storage devices divided into at least a first slice occupying logical block address 0 to n and a second slice occupying logical block addresses n+1 to m;
a first combination having all the first slices of the physical storage devices implementing a first RAID method that uses independent IO;
a second combination having all the second slices of the physical storage devices implementing a second RAID method that uses synchronized IO, the second RAID method being different from the first RAID method; and
whereby the RAID method chosen for each combination is based on desired input/outputs per second (IOPS) and data protection for data to be stored in the respective logical block addresses of the combination, and
wherein the data on each slice, according to its RAID method, may be rebuilt upon failure and replacement of a particular physical storage device of the plurality of physical storage devices.

9. The data storage system claim 8, wherein the first combination utilizes RAID1.

10. The data storage system of claim 8, wherein the first combination utilizes RAID0.

11. The data storage system of claim 8, wherein the second combination utilizes RAID5.

12. The data storage system of claim 8, wherein the first combination utilizes single-parity RAID method.

13. The data storage system of claim 8, wherein the second combination utilizes a single-parity RAID method.

14. The data storage system of claim 8, wherein each physical storage device is a low latency solid state device.

15. A computer program product, comprising a non-transitory computer-readable medium having a computer-readable program code embodied therein, said computer-readable program code executed to implement a method for optimizing the performance, capacity and redundancy of a plurality of physical storage devices, the method comprising:
dividing each of the physical storage devices into at least two logical slices, a first slice of each physical storage device occupying logical block address 0 to n, and a second slice of each physical storage device occupying logical block addresses n+1 to m;
assigning a first combination having all the first slices of the physical storage devices to a first RAID method that uses independent IO;
assigning a second combination having all the second slices of the physical storage devices to a second RAID method that uses synchronized IO; and
automatically rebuilding the data on each slice, according to its RAID method, of a particular physical storage device upon failure and replacement of the particular physical storage device,
whereby the second RAID method is different from the first RAID method, and each RAID method is assigned to its respective combination based on desired input/outputs per second (IOPS) and data protection for data to be stored in the respective range of logical block addresses of the combination.

16. The computer program product of claim 15, wherein the first combination utilizes RAID1.

17. The computer program product of claim 15, wherein the first combination utilizes RAID0.

18. The computer program product of claim 15, wherein the second combination utilizes RAID5.

19. The computer program product of claim 15, wherein the first combination utilizes single-parity RAID method.

20. The computer program product of claim 15, wherein the second combination utilizes a single-parity RAID method.

21. The computer program product of claim 15, wherein each physical storage device is a low latency solid state device.

* * * * *